2 Sheets—Sheet 1.

A. DESTOUY, dec'd

H. Miller, Assignee by mesne assignments of M. H. Destouy, Adm'x.

MOLDING SHEET METAL.

No. 7,609. Reissued April 17, 1877.

Attest.

Ewell & Sick

E. E. Masson

August Destouy, Inventor:

Herman Miller assignee by

A. Pollok his attorney

A. DESTOUY, dec'd.

H. Miller, Assignee by mesne assignments of M. H Destouy, Adm'x.

MOLDING SHEET METAL.

Reissued April 17, 1877.

No. 7,609.

Attest:

Evelle Adick

E. E. Masson

August Destouy

Inventor.

Herman Miller assignee by

A. Pollok his attorney.

UNITED STATES PATENT OFFICE.

HERMAN MILLER, OF NEW YORK, N. Y., ASSIGNEE, BY MESNE ASSIGNMENTS, OF MARIE H. DESTOUY, ADMINISTRATRIX OF AUGUSTE DESTOUY, DECEASED.

IMPROVEMENT IN MOLDING SHEET METAL.

Specification forming part of Letters Patent No. 43,979, dated August 30, 1864; reissue No. 7,609, dated April 17, 1877; application filed March 8, 1877.

*To all whom it may concern:*

Be it known that AUGUSTE DESTOUY, late of New York, in the county and State of New York, now deceased, did invent a new and useful Improvement in the Manufacture of Metal Moldings; and I do hereby declare that the following is a full, clear, and exact description thereof, which will enable those skilled in the art to make and use the same, reference being had to the accompanying drawings, making a part of this specification, in which—

Figure 1:
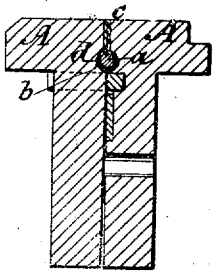
Figure 3:
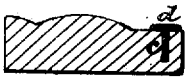
Figure 2:
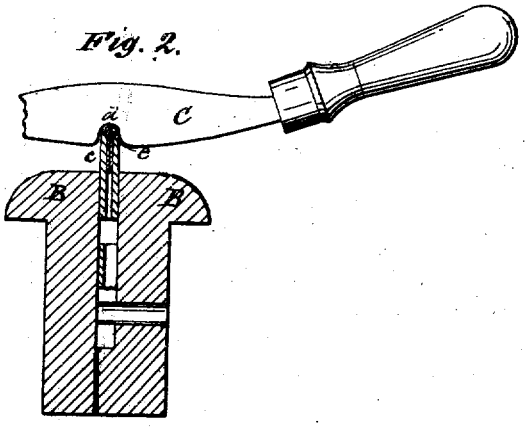
Figure 4:
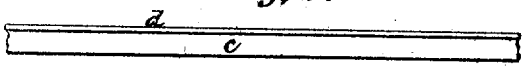
Figure 5:
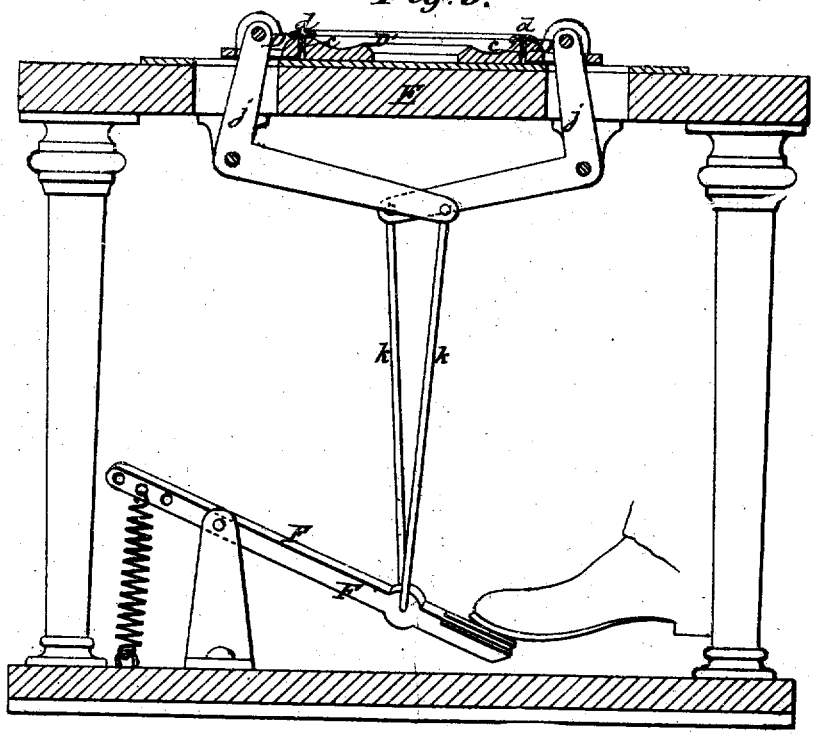
Figure 6:
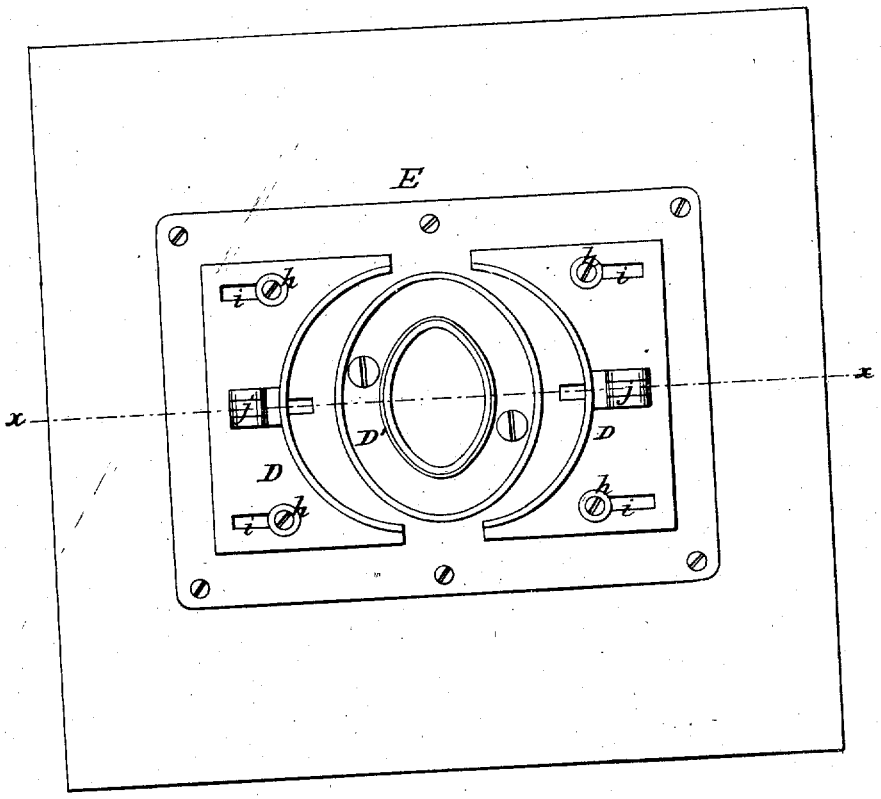

Figure 1 is a section of the jaws which I use in making my moldings. Fig. 2 is a similar view of another set of jaws, which serve to hold the moldings while they receive their finishing touch. Fig. 3 is a sectional view of a piece of wood ornamented by one of my metal moldings. Fig. 4 is a side elevation of one of my moldings. Fig. 5 is a longitudinal vertical section of the apparatus which I use to make curved moldings of the required shape for picture-frames, the plane of section being indicated by the line *x x*, Fig. 5. Fig. 6 is a plan or top view of the same.

Similar letters of reference indicate corresponding parts.

This invention consists in the employment or use of metal moldings made of thin sheet metal, bent to the form of a T, in combination with doors, windows, furniture of any kind, picture-frames, &c., in such a manner that, by means of a thin vertical shank, said T-shaped moldings can be readily inserted into the articles to be ornamented, and if the moldings are bent, and their ends fastened together by soldering, they can be used in picture-frames to protect the inner edge, to retain the glass and the picture, and to form an ornament.

Moldings made in accordance with this invention are made of narrow strips of thin sheet metal, which are bent round a wire, *a*, by means of two jaws, A A, as shown in Fig. 1 of the drawing. These jaws are made of cast-iron or other suitable material, with a recess, *b*, large enough to receive the wire *a*, with the metal wound round it, as shown in said figure. When the jaws are open, the wire, together with the sheet metal, can be readily depressed into the recess *b*, and by closing the jaws the metal is bent round the wire, and brought into the shape shown in Fig. 1. If the moldings are to be used for ornamenting the edges of doors, windows, or of furniture which are straight, or which may form slow irregular curves, the moldings, on being removed from the jaw A, are finished by inserting the shank *c* of the same in the jaws B, Fig. 2, and crowding the loop *d* down over the top edge of said jaws by a tool, C, with a recess, *e*, in its bottom edge. On being removed from these jaws, the moldings are ready to be inserted into the articles to be ornamented. This operation is effected by making a small incision in the surface of said article, capable of receiving the shank *c* of the molding, and then the molding is driven in, as shown in Fig. 3 of the drawing. If it is desired to make moldings for the purpose of ornamenting oval picture-frames, or other articles for which they have to be curved, correspondingly curved jaws D D′ are substituted for the jaws B, such as shown in Figs. 5 and 6 of the drawing. The jaws represented in these two figures are intended to bend the moldings in the form of an oval, ready to be inserted into the edges of an oval picture-frame; but it is obvious that the shape of the jaws can be changed to suit curves of any other description. The jaw D′ is stationary, and secured in a horizontal position to the table E, and it forms the exact counterpart of the oval to which the moldings are to be bent. The jaws D are movable, each representing one-half of the oval, as clearly shown in Fig. 6. They are guided in their motion by screws *h*, passing through slots *i*, and each connects, by an elbow-lever, *j*, and rod *k*′, with a treadle, F, situated under the table E. By depressing these treadles, one jaw after the other can be closed up, and if both jaws are closed, they fully embrace the stationary jaw D′. The moldings to be curved or bent are first exposed to the action of the jaws A, Fig. 1, as previously described, and on being removed from said jaws, they are introduced between the jaws D D′, and, by closing up the jaws D, brought in the desired form. While the jaws D are yet closed, the loops of the moldings are depressed by a tool, C, similar to that shown in Fig. 2, bringing the same in the form shown in Fig. 5, and on being removed from the jaws D D′, their ends are united by soldering, and they are ready to be inserted into a picture-frame or other similar article. By means of their shanks *c*, the moldings can be readily secured to the frames, either by springing them into the inner edge of the frame, or by inserting them in a suitable incision, as previously described.

These moldings are easily made, they are light and cheap, and when properly burnished they produce a highly ornamental finish.

What is claimed as the invention of said DESTOUY, deceased, is as follows:

1. T-shaped metal moldings, made substantially as and for the purpose specified.

2. The jaws B or D D′, either straight or curved, and tool C, constructed and operating substantially as herein set forth, for the purpose of imparting to the moldings the final touch before they are applied to the article to be ornamented.

3. The combination, with a table having a stationary jaw or anvil, of movable jaws, operating as shown and described, to compress the bent metal against said stationary jaw.

4. The combination, with a table having a stationary jaw or anvil and movable jaws, as described, of treadles connected with said movable jaws by levers, substantially as and for the purposes herein set forth.

HERMAN MILLER,
*Assignee.*

Witnesses:
WM. S. BEAMAN,
E. N. DICKERSON, Jr.